United States Patent [19]
Paul

[11] Patent Number: 5,152,604
[45] Date of Patent: Oct. 6, 1992

[54] RECIRCULATING DEBRIS SEPARATING METHOD AND APPARATUS

[75] Inventor: Kermit D. Paul, Bethlehem, Pa.

[73] Assignee: Fuller Company, Bethlehem, Pa.

[21] Appl. No.: 383,406

[22] Filed: Jul. 24, 1989

[51] Int. Cl.⁵ .................... B01F 13/02; B07B 7/00
[52] U.S. Cl. .................... 366/101; 209/142; 209/139.1; 209/150; 209/154; 366/107
[58] Field of Search ............ 209/138, 139.1, 140–143, 209/145, 146, 147, 149, 150, 154; 366/101, 107

[56] References Cited

U.S. PATENT DOCUMENTS

| | | | |
|---|---|---|---|
| 1,165,866 | 12/1915 | Fraser | 209/143 X |
| 1,914,862 | 6/1933 | Menk | 209/150 |
| 1,953,058 | 4/1934 | Andrews et al. | 209/143 |
| 2,695,197 | 11/1954 | Burtis | 209/139.1 X |
| 2,973,861 | 3/1961 | Jager | 209/1 |
| 3,312,342 | 4/1967 | Brown | 209/138 X |
| 3,386,707 | 6/1968 | Brown | 366/107 |
| 3,494,217 | 2/1970 | Tanaka et al. | 209/138 X |
| 4,569,596 | 2/1986 | Romanchik et al. | 366/107 |
| 4,792,235 | 12/1988 | Paul | 366/107 |
| 4,834,544 | 5/1989 | Paul | 366/101 |
| 5,018,869 | 5/1991 | Paul | 366/101 |

FOREIGN PATENT DOCUMENTS

| | | | |
|---|---|---|---|
| 0898109 | 11/1953 | Fed. Rep. of Germany | 366/101 |
| 0134487 | 3/1979 | Fed. Rep. of Germany | 366/101 |
| 52-11569 | 1/1977 | Japan | 209/139.1 |
| 0233155 | 5/1925 | United Kingdom | 209/143 |

Primary Examiner—Michael S. Huppert
Assistant Examiner—Edward M. Wacyra
Attorney, Agent, or Firm—Daniel DeJoseph

[57] ABSTRACT

A method and apparatus are disclosed for separating debris from a material product by recirculating the product in a product chamber with a fluid flow and using the fluid flow to entrain and remove debris.

7 Claims, 2 Drawing Sheets 5,152,604

RECIRCULATING DEBRIS SEPARATING METHOD AND APPARATUS

BACKGROUND OF THE INVENTION

1. Field of the Invention

The present invention relates to the field of materials handling and more particularly to the field of separating debris from a material. During debris separation, undesired debris is separated from conveyed materials prior to a desired processing operation conducted on those materials.

The invention has particular utility in producing debris-free plastic pellets used in the plastics extrusion industry.

During the process of manufacturing and conveying the plastic pellets, which are typically cylindrical in shape and of ⅛ to 3/16 inches in diameter and ⅛-3/16 inches long, plastic debris is created in the form of fines, streamers, "angle-hair" and "snake skins". This debris causes problems to an end-user, such as plugging of equipment, etc. and it is therefore desirable to remove this debris to the greatest extent possible from the pelletized material before it is sent to the end-user.

SUMMARY OF THE INVENTION

Accordingly, an object of the invention is the provision of a recirculating debris separator which separates debris from a material.

Another object of the invention is the provision of a unique control system for providing an automatic control of a recirculating debris separation operation in accordance with a characteristic of the debris which is being separated from a material feed.

The above and other objects, advantages and features of the invention will be more readily understood from the following detailed description of the invention which is provided in connection with the accompanying drawings.

DETAILED DESCRIPTION OF THE INVENTION

Figure 1:
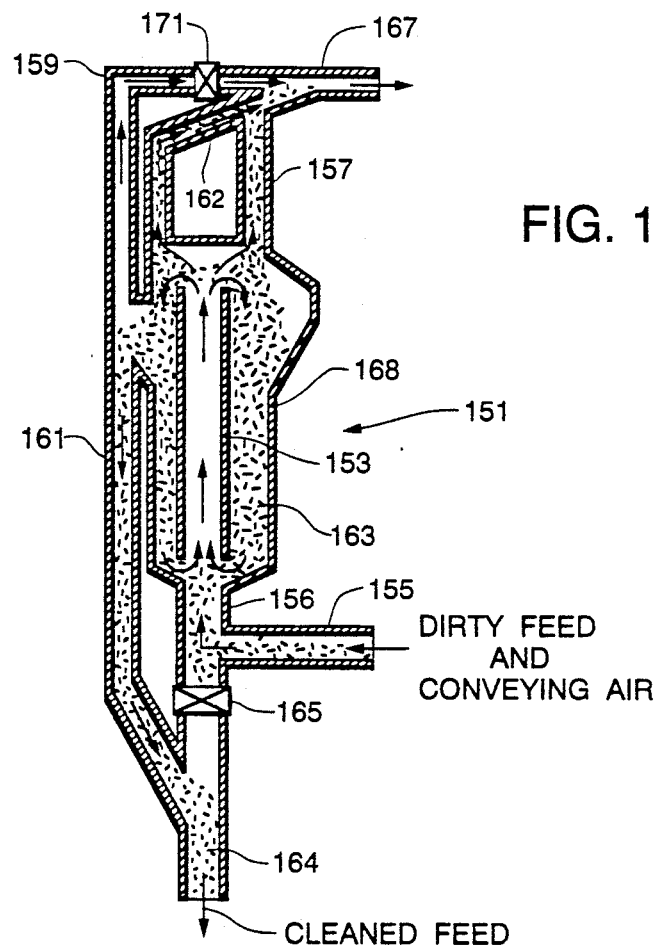
FIG. 1 illustrates one embodiment of a debris separator of the invention.

FIG. 1 illustrates at 151 a stand-alone bottom feed multi-pass debris separator in accordance with a first embodiment of the invention. Separator 151 is the form of a vessel 168 which defines an interior inventory chamber 163. A vertical lift pipe 153 is disposed within chamber 163. Dirty feed and conveying fluid, e.g. air, enter vessel 168 through an inlet conduit 155 and pass up a vertical lift pipe 153 which is spaced from and in co-axial alignment with a vertical portion 156 of inlet 155. The plastic pellets discussed above are one exemplary feed with which the FIG. 1 debris separator can be used. The conveying air pulls feed residing in product inventory chamber 163 from a lower portion of chamber 163 up through the lift pipe 153 as the conveying air passes from inlet portion 156 to lift pipe 153. The conveying air, which carries the feed and associated the debris into lift pipe 153, then passes through a conduit or flow passage 157 provided at the top of the vessel 168 and out through an exit conduit 167. The heavier feed particles conveyed through lift pipe 153 fall by gravity back into product inventory chamber 163 where they are again circulated up through lift pipe 153 by newly entering feed and conveying air through conduit 155 which continually pulls feed in chamber 163 upwardly through lift pipe 153. An overflow clean product conduit 161 is connected to an upper portion of chamber 163 and is provided to extract cleaned feed from chamber 163 which then exits the separator 151 through a clean feed outlet 164. A drain valve 165 is also provided to periodically drain the separator 151 of all feed therein including that residing in product inventory chamber 163.

The separator illustrated in FIG. 1 also includes a bypass control valve 171 in a bypass conduit 159. The bypass conduit 159 causes a portion of the conveying air to divert from its generally upward flow through the separated debris flow passage 157 which in turn reduces the air flow rate through passage 157 and this controls the type of debris which is separated from the product. The bypass flow control valve 171 may be automatically controlled by the FIG. 3 control system described below to thereby control the degree or intensity of debris separation which occurs with the multi-pass fine separator illustrated in FIG. 1.

Figure 2:
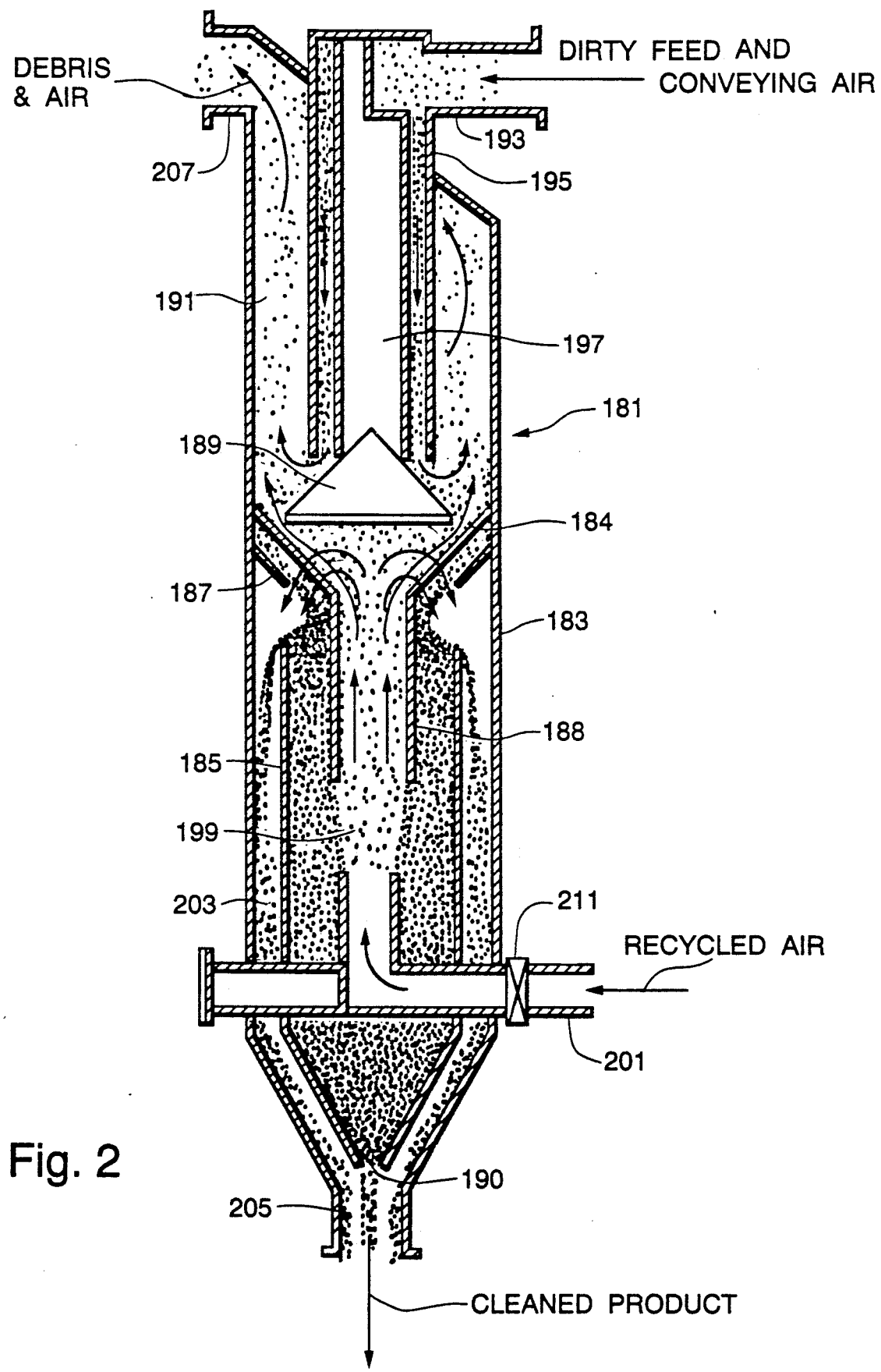
FIG. 2 illustrates a second embodiment of a debris separator of the invention.

FIG. 2 illustrates a second embodiment of a stand-alone top feed multi-pass debris separator 181. In the FIG. 2 debris separator a feed and conveying fluid, e.g. air, pass through an inlet 193 provided at the top of separator 181. Both then pass through a feed and conveying air annular conduit 195 in a downward direction. The feed exits conveying conduit 195 at a conical deflector 189 which causes the feed to move radially outwardly and drop by gravity through gussets 184 which support a lift pipe 188 onto a funnel-like guide 187 which channels the feed into a product inventory chamber 185.

The conveying air passing through annular conduit 195 reverses direction and moves upwardly upon leaving conduit 195. Recycle air enters through an inlet 201 and passes through a control valve 211 and then upwardly through the product inventory chamber 185 and into lift pipe 188. This causes product residing in a lower portion of chamber 185 to be pulled upwardly through lift pipe 188. Lift pipe 188 guides product from chamber 185 and conveying air up to an area around the bottom of conical deflector 189. The upwardly flowing air from lift pipe 188 continues flowing upwardly into a separated debris flow passage 191. By the mixture of the upcoming air with the feed dropping off the conical deflector 189, the upwardly flowing air removes debris from the down flowing feed and carries it through the debris flow passage 181 up to and out the debris and dirty air outlet 207. The recycle air passing through lift pipe 188 also entrains and carries debris exiting lift pipe 188 into debris flow passage 191.

Cleaned product overflows the product inventory chamber 185 and passes downwardly through an annular flow passage 203 to a cleaned product outlet 205. The intensity or degree of debris separation is controlled by controlling the opening of valve 211 which allows more or less air flow into separator 181 and which may be automatically controlled by the control system illustrated in FIG. 3 and discussed below. Thus, the degree or intensity of debris separation with the top filled multi-pass debris separator 181 can also be effectively automatically adjusted.

The separator 181 also has a drain hole 190 for automatically draining the product inventory in chamber 185 at shutdown.

The separators illustrated in FIGS. 1 and 2 continuously recycle and clean a feed conveyed thereto and thus operate to separate debris from a conveyed feed material, such as the plastic pellets discussed above. The removed debris includes fines, streamers, "snake skins", and "angel hair", etc.

Figure 3:
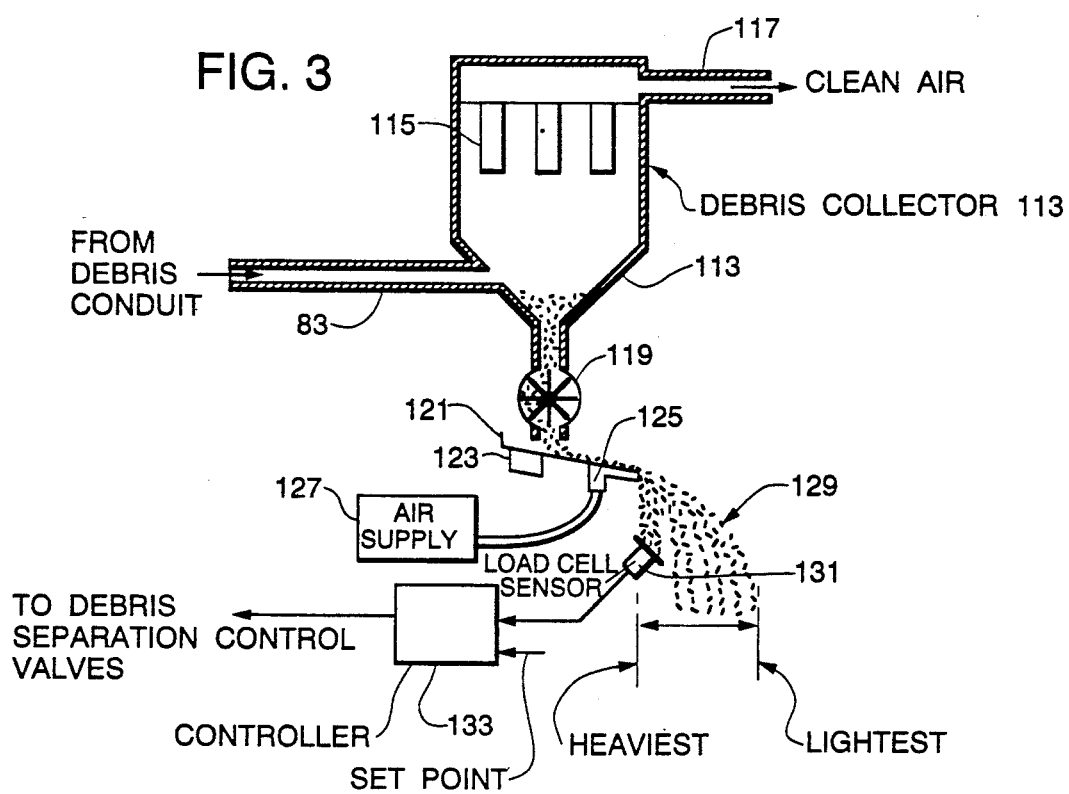
FIG. 3 illustrates an automatic control system which is preferably used with FIGS. 1 and 2 embodiments for controlling debris separation.

FIG. 3 represents a control apparatus which is connected with the debris outlet conduit 167 illustrated in FIG. 1, or 207 illustrated in FIG. 2. The debris and conveying air within conduit 167 or 207 enter a conventional debris collector 113 which includes a clean air outlet 117 and a plurality of dust bags 115 located therein. The entering debris falls to the bottom of the debris collector 113 and a rotary valve 119 is used to convey the debris at the bottom of the debris collector 113 onto an inclined pan feeder 121. The lighter dust particles are collected by the dust bags 115 as the conveying air passes therethrough to the clean air outlet 117.

The pan feeder 121 is vibrated by a piezoelectric vibrator 123 so that the debris particles which are deposited on pan feeder 121 are conveyed by vibration towards a lower end portion of the pan feeder under which is provided an air nozzle 125. The air nozzle receives air from an air supply 127 and blows the debris cascading off the end of the pan feeder 121 to separate the debris particles by weight into a range encompassing the heaviest to the lightest particles. The heaviest particles strike a load cell sensor 131 so that the rate at which the heavier particles strike sensor 131 is conveyed to a controller 133. Controller 133 includes a set point input and provides an output signal which is used to automatically control bypass valves 167 of FIG. 1. Thus, controller 133 operates to control, by means of the bypass valve, the amount of air flow which carries debris through passage 157, to thereby vary the flow rate of the air and the degree or intensity of debris removal. If too many heavier particles strike load sensor 131 this indicates that the air flow rate through passage 157 is too high and must be adjusted downwardly. Similarly, if not enough heavier particles strike load sensor 131, this indicates that the air flow needs to be increased so that a desired amount of heaviest particles are detected at load sensor 131 and the debris separating air flow through the feed is properly adjusted.

For the FIG. 2 embodiment, the FIG. 3 control system adjusts the flow rate of the recycle air and thus the degree of debris separation by controlling valve 211.

While various embodiments of the invention have been described and illustrated above in connection with FIGS. 1-3, it should be apparent that many modifications can be made to the invention without departing from its spirit and scope. Accordingly, the invention is not limited by the foregoing description, but is only limited by the scope of the appended claims.

What is claimed is:

1. A recirculating debris separating apparatus comprising:
   a debris separation vessel having a product inventory chamber therein;
   a vertically extending lift pipe disposed within said vessel and extending into said product inventory chamber;
   a dirty product inlet conduit at a lower portion of said chamber, said inlet conduit having a portion thereof in co-axial alignment with said lift pipe, but spaced from a lower end of said lift pipe, said dirty product inlet conduit receiving a dirty material product in a conveying fluid, said conveying fluid carrying said dirty product and a material product residing in a lower portion of said chamber vertically upwardly through said lift pipe;
   a cleaned product overflow conduit connected to an upper portion of said chamber;
   a debris outlet conduit connected to receive said conveying fluid and entrained debris after said conveying fluid exits an upper end of said lift pipe, whereby the heavier portions of said dirty product and material product conveyed through said lift pipe fall into said product inventory chamber and lighter portions thereof pass upwardly with said conveying fluid into said debris outlet;
   a bypass conduit for bypassing a portion of said conveying fluid which exits said lift pipe from entering into said debris outlet conduit;
   a control valve provided in said bypass conduit for controlling the flow of said conveying fluid through said bypass valve, said control valve being controlled by a control signal generated by a control system comprising (1) means for removing collected debris from the fluid flow passing through said debris outlet conduit; (2) means for segregating removed debris in accordance with a predetermined characteristic, and (3) means for determining the flow rate of debris having said predetermined characteristic and providing said control signal which is representative thereof, said means for determining comprising (a) an inclined pan feeder which receives removed debris from said removing means, means for vibrating said pan feeder so that removed debris cascades off a lower end of said feeder, means for passing a fluid through said debris as it cascades off said pan feeder to segregate said debris in a range from heaviest to lightest debris, and means for detecting the heaviest segregated debris to generate a flow rate signal; and (b) means for comparing said flow rate signal with a reference value and for providing a signal representative of a degree of comparison.

2. An apparatus as in claim 1 further comprising a drain valve provided at a lower portion of said product inventory chamber for draining said product inventory chamber.

3. A recirculating debris separating apparatus comprising:
   a debris separation vessel having a product inventory chamber therein;
   a vertically extending lift pipe disposed within said vessel and extending into said product inventory chamber;
   a recycle fluid inlet conduit at a lower portion of said vessel and having a portion within said chamber in co-axial alignment with said lift pipe, but spaced from a lower end of said lift pipe, said recycle fluid inlet receiving a recycle fluid and directing it upwardly through said lift pipe whereby said recycle fluid conveys a material product from a lower portion of said product inventory chamber upwardly through said lift pipe;
   a dirty material product inlet conduit for receiving a conveying fluid conveying a dirty product, said dirty material inlet being located at an upper portion of said vessel and connected with a dirty product conveying conduit, said conveying conduit being vertically disposed within said vessel and having an upper end connected to said dirty product inlet conduit;

means provided at a lower end of said conveying conduit for guiding descending product from said conveying conduit into said product inventory chamber, while permitting recycle fluid passing upwardly through said lift pipe to pass through said descending product;

means for guiding said recycle fluid after it passes through said descending product to a debris outlet conduit;

a cleaned product passage for receiving cleaned product from said product inventory chamber;

a control valve for controlling the flow rate of the recycle fluid through said recycle fluid inlet; and a control system for controlling said control valve with a control signal, comprising (1) means for removing collected debris from the recycle fluid flow passing through said debris outlet conduit; (2) means for segregating removed debris in accordance with a predetermined characteristic, and (3) means for determining the flow rate of debris having said predetermined characteristic and providing said control signal which is representative thereof, comprising (a) an inclined pan feeder which receives removed debris from said removing means, means for vibrating said pan feeder so that removed debris cascades off a lower end of said feeder, means for passing a fluid through said debris as it cascades off said pan feeder to segregate said debris in a range from heaviest to lightest debris, and means for detecting the heaviest segregated debris to generate a flow rate signal; and (b) means for comparing said flow rate signal with a reference value and for providing said control signal representative of a degree of comparison.

4. An apparatus as in claim 3 wherein said guiding means comprises a conical deflector for disbursing said descending product outwardly and a funnel like deflector for receiving descending product from said conical deflector and guiding it toward an upper opening in said product inventory chamber.

5. An apparatus as in claim 4 wherein said conveying conduit is in axial alignment with said lift pipe and said recycle fluid exiting said lift pipe passes under and upwardly around said conical deflector to thereby pass through said descending product.

6. An apparatus as in claim 3 wherein said cleaned product passage is an annular conduit surrounding said product inventory chamber and which receives cleaned product overflowing from said product inventory chamber.

7. An apparatus as in claim 6 wherein said product inventory chamber has a cleaned product outlet at a lower portion thereof.

* * * * *